(12) United States Patent
Fuller

(10) Patent No.: US 7,775,260 B2
(45) Date of Patent: Aug. 17, 2010

(54) EXPANSION TANK WITH ALARM SYSTEM

(76) Inventor: James Fuller, 101 Tank St., Greenwood, IN (US) 46143

( * ) Notice: Subject to any disclaimer, the term of this patent is extended or adjusted under 35 U.S.C. 154(b) by 466 days.

(21) Appl. No.: 11/500,219

(22) Filed: Aug. 8, 2006

(65) Prior Publication Data

US 2008/0035303 A1 Feb. 14, 2008

(51) Int. Cl.
*B60H 1/00* (2006.01)
*F28D 15/00* (2006.01)

(52) U.S. Cl. .................... 165/11.1; 165/104.32
(58) Field of Classification Search ........... 165/11.1, 165/104.32, 104.27; 237/66; 220/723, 721, 220/722, 694.1, 495.01; 138/28, 30
See application file for complete search history.

(56) References Cited

U.S. PATENT DOCUMENTS

| 6,041,820 | A | * | 3/2000 | Boehme | .................... | 138/30 |
| 6,160,482 | A | * | 12/2000 | Hill | .................... | 340/625 |
| 2007/0186873 | A1 | * | 8/2007 | Polkhouskiy | ............ | 122/14.2 |

* cited by examiner

*Primary Examiner*—Tho v Duong
(74) *Attorney, Agent, or Firm*—Olson & Cepuritis, Ltd.

(57) ABSTRACT

An expansion tank comprising a bladder style water storage tank and method of use. The expansion tank includes an alarm module to sense a flooded tank condition. The system also has the ability to sense a bladder over-extended condition. The expansion tank use includes a sonic alarm and/or a visual alarm and is used in combination with a boiler or related hot water system. Method steps using the described design are also included. The hydro-pneumatic expansion tank has important utility in HVAC, boiler and potable water systems.

5 Claims, 6 Drawing Sheets

EXPANSION TANK WITH ALARM SYSTEM

BACKGROUND AND OBJECTS OF THE INVENTION

The present invention is generally related to the heating, ventilating and cooling (HVAC) arts and, in particular, to an expansion tank for use with HVAC systems.

Expansion tanks are utilized to collect excess fluid from closed loop HVAC systems and to adjust system pressure as needed.

At least some expansion tanks include a bladder or diaphragm element to receive the excess fluid and a surrounding compressed air section to control over-all system pressure.

It has been realized in the art that it would be advantageous to detect system failures such as a break in the bladder or a condition wherein the bladder has been overly expanded.

Accordingly, it is an object of the invention to demonstrate an expansion tank having warning means mounted therein.

It is a further object of the invention to show a water expansion tank system and method of use which includes a fail safe actuator mechanism that will not damage a bladder, membrane or diaphragm which is a part of the system.

It is also an object to set forth an expansion tank system having a sensor element which is able to detect dual possible failure modes, i.e. tank flooding and/or over-flexing of a tank bladder, membrane or diaphragm.

It is also an object to demonstrate a water tank alarm system which is designed in module form so that it may be readily changed out or installed through a tank coupling.

The alarm module is designed to be widely applicable and to be installed on a vertically placed tank or on a horizontally placed water expansion tank.

It is also an object to set forth an alarm module which may be economically mass produced for widespread commercial appeal.

It is a further object of the invention to describe a water tank alarm module system which includes sonic alarm means and a visual alarm indicator light to indicate possible tank flooding or a condition in which the bladder, diaphragm or membrane is in an overly flexed condition.

The system also inherently detects a condition of low air pressure within a water expansion tank by means of a single sensor/indicator element.

As is customary in the art, reference to air pressure refers to air volume. The system may further include top mounted and top/bottom mounted bladders. The expansion tank, also known as a hydro-pneumatic expansion tank, has further important uses in the potable water system arts.

PRIOR ART PATENTS AND DESIGNS

During the course of preparing this specification for submission to the U.S. Patent and Trademark Office, a full search of the prior art was conducted. This search included the HVAC arts generally and the water expansion tank arts in particular.

U.S. Pat. No. 4,008,755 shows the use of a leak indicating apparatus for an expansion tank in an air conditioning system.

U.S. Pat. No. 5,673,025 teaches the use of a fluid leak detector device in an oil system used in combination with a tractor.

U.S. Pat. No. 4,784,181 describes an expansion tank with a bladder or diaphragm and related elements.

The present invention recites numerous novel elements and features and is believed to be clearly patentable over all known prior art systems and methods of use.

SUMMARY OF THE INVENTION

The alarm module system and method of use is in combination with a specially designed water expansion tank having a bladder or diaphragm which is mounted or anchored at a lower portion of the tank.

A pivotable sensor is positioned at a location on the inner tank wall. The pivotable sensor is in the form of a float which responds to flooding in the tank or to over-flexing of the bladder or diaphragm which may indicate low tank air pressure.

The pivotable sensor in incorporated into an alarm module element for easy installation or removal as needed.

The pivotable sensor extends from a fixed extension element attached to the alarm module. A magnet element is utilized to complete an alarm circuit when a condition of tank flooding or bladder over extension is present. The alarm module is specially designed for use in combination with an expansion tank having an anchored bladder or membrane.

BRIEF DESCRIPTION OF THE DRAWING FIGURES

FULL DESCRIPTION OF A PREFERRED EMBODIMENT

Figure 1:
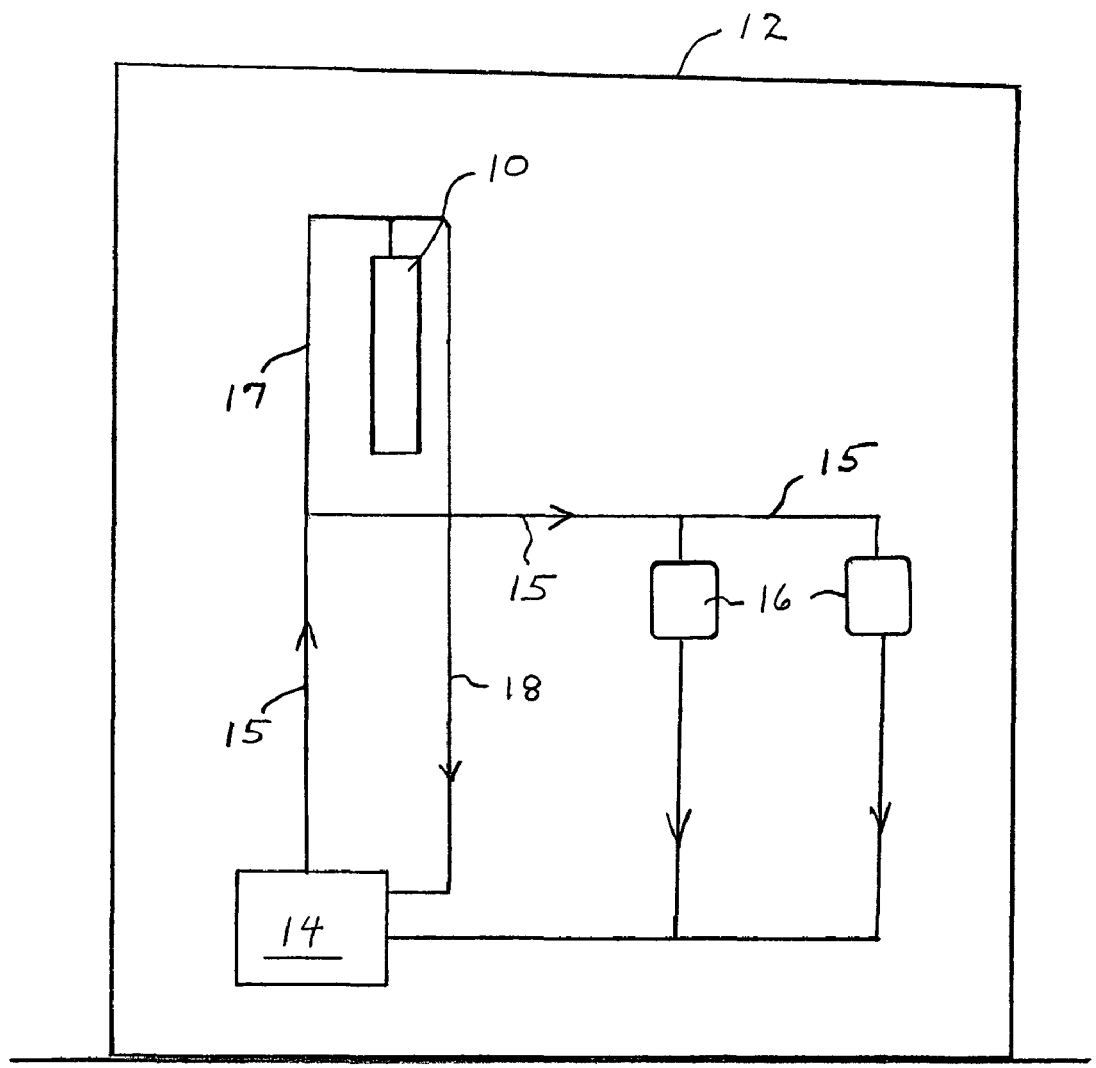
FIG. 1 is a view of an expansion tank in combination with a heating system.

Referring to the drawing figures, FIG. 1 shows a schematic view of the type of HVAC system in which the expansion tank of the invention is utilized.

The system within structure 12 includes the expansion tank 10 in a heating system including a boiler or hot water heater 14. Supply lines 15 extend from the boiler to radiator/heat transfer units 16.

Line 17 provides that water from the system can expand into tank 10 when required, for example, by high system pressure. Line 18 extends from the expansion tank 10 back to the boiler or hot water heater 14 to return water to the system under suitable conditions.

Figure 2:
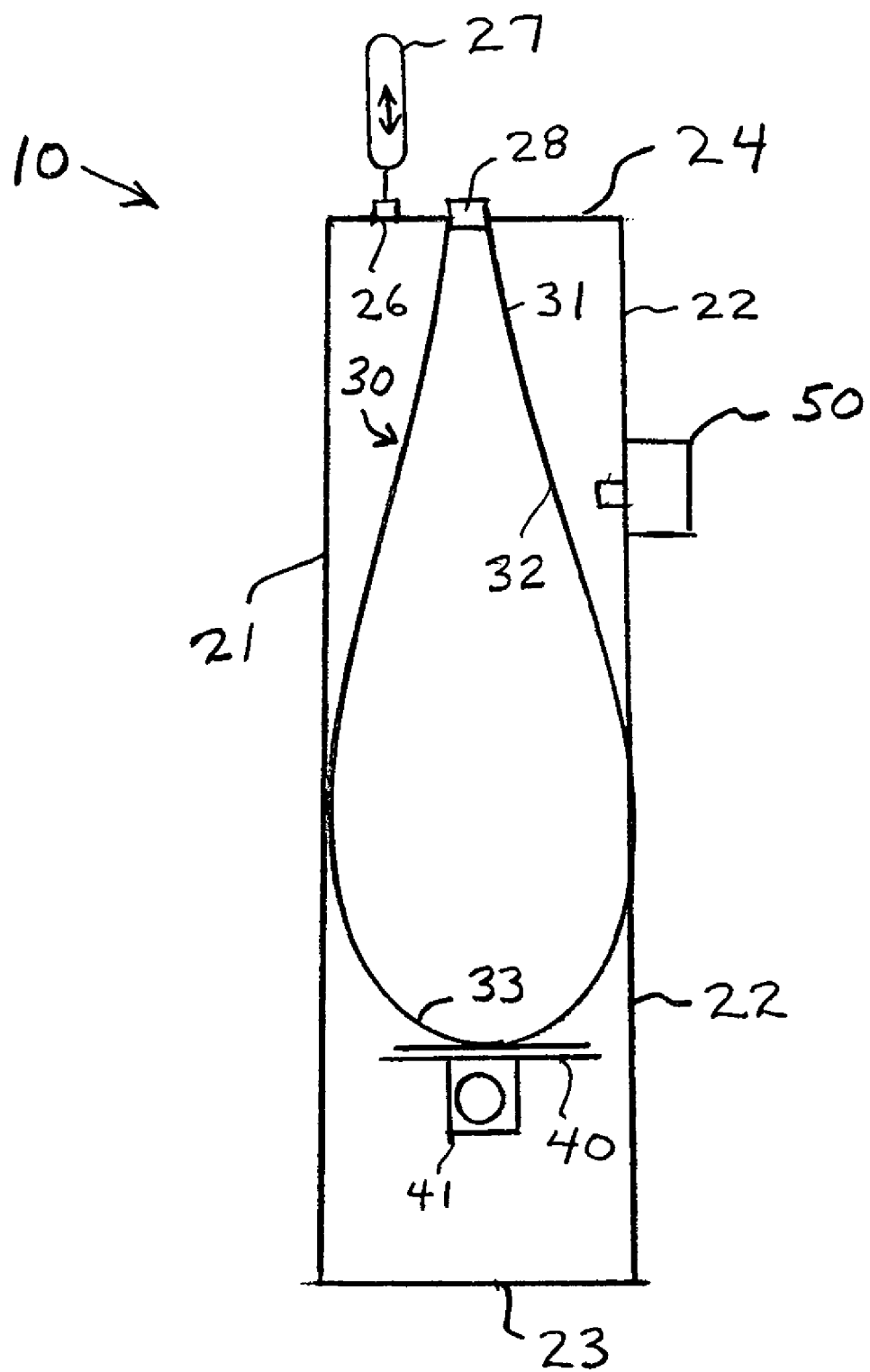
FIG. 2 is a side schematic view of a water expansion tank having a bladder, membrane or diaphragm being anchored at a lower end and having an alarm module placed in a wall thereof.

The expansion tank 10 is shown schematically in a vertical position in FIGS. 1 and 2. The expansion tank may also be utilized in a horizontal position depending upon particular system requirements.

Referring to FIG. 2, the water expansion tank 10 is shown as having left, right, bottom and top wall portions 21, 22, 23 and 24.

The top wall 24 includes a first aperture 26 for admitting or removing compressed air to or from the tank 10 via an air pressure supply/regulator shown schematically at numeral 27.

The top wall portion 24 further includes an aperture/valve 28 for receiving expanded water from a heating system.

The expansion tank further includes a bladder 30 which is designed to receive and expel system water as needed. Bladder 30 is also denominated in the art as a diaphragm or membrane.

As indicated in FIG. 2, the bladder 30 includes an upper reduced area portion 31, an upper middle portion 32 and a lower wider portion 33.

Support and anchor elements for the lower portion of the bladder are shown generally at numerals 40 and 41.

FIG. 2 further shows the position of the alarm module 50 which is located in side wall portion 22 about one-third of the way down the expansion tank and the bladder element 30.

The alarm module 50 is positioned such that, upon an undesired condition of hyper-expansion of the bladder 30, bladder middle portion 32 contacts the alarm module 50.

As will be further understood, the same alarm module 50 also responds to a flooded condition within the expansion tank, i.e. where water has escaped the bladder and is contacting the walls 21, 22 and 23 of the expansion tank.

Figure 3:
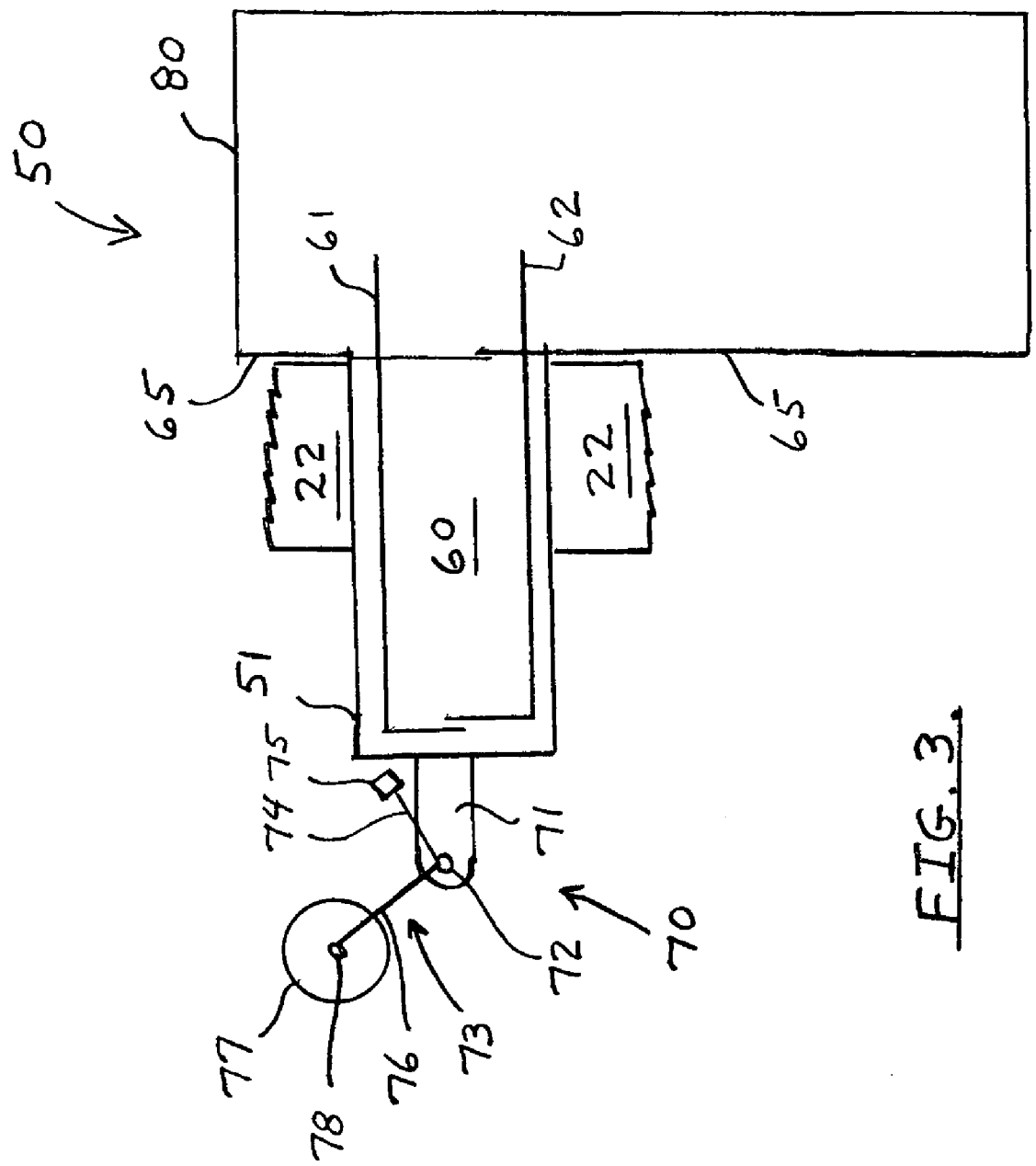
FIG. 3 is a side schematic view of the alarm module with a float/actuation element in a lower position.

Referring to FIG. 3, the alarm module 50 includes a left section 51 which is placed within the right side wall portion 22 of the expansion tank.

The left section 51 includes a circuit protection area 60 and at least two circuit lines as indicated at 61 and 62.

As further shown in FIG. 3, an actuator/float section 70 includes a fixed extending arm 71 having a pivot point 72.

An L-shaped piece 73 is attached to the pivot point 72.

L-shaped piece 73 includes a first arm 74 with a magnet 75 on one end thereof.

L-shaped piece 73 further includes a second arm 76 having a float 77 attached thereto via means indicated schematically at numeral 78.

As will be further described, when float 77 is moved upwardly, either by water flooding force or by over-extended bladder/membrane force, magnet 75 is moved downwardly to close the circuit created by lines 61 and 62.

As further indicated in FIG. 3, the alarm module 50 also includes a flange portion 65 which is between the left section 51 and a right section 80. Flange portion 65 is designed to abut against the tank wall 22.

Figure 4:
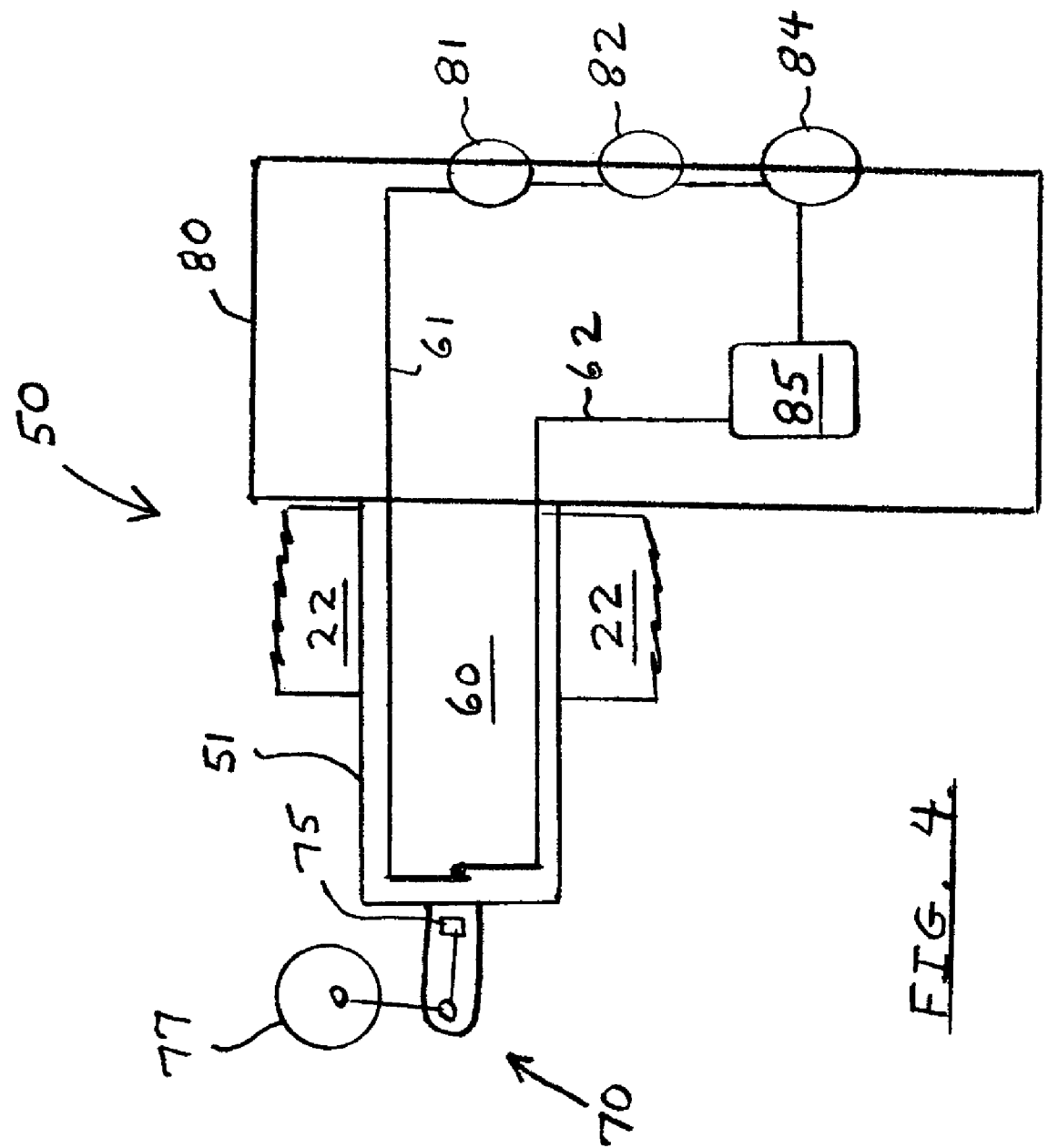
FIG. 4 is a side schematic view of an alarm module with the float/actuation element in an upper alarm actuating element. Such is in response to tank flooding or bladder/membrane over-expansion.

Referring to FIG. 4, the float 77 is in an upward position and the circuit is closed.

This enables a sonic alarm 81 and/or a visual light alarm 82 to be activated.

The system also includes on/off/reset functions as indicated at numeral 84. A battery or equivalent power supply is indicated at 85.

Figure 5:
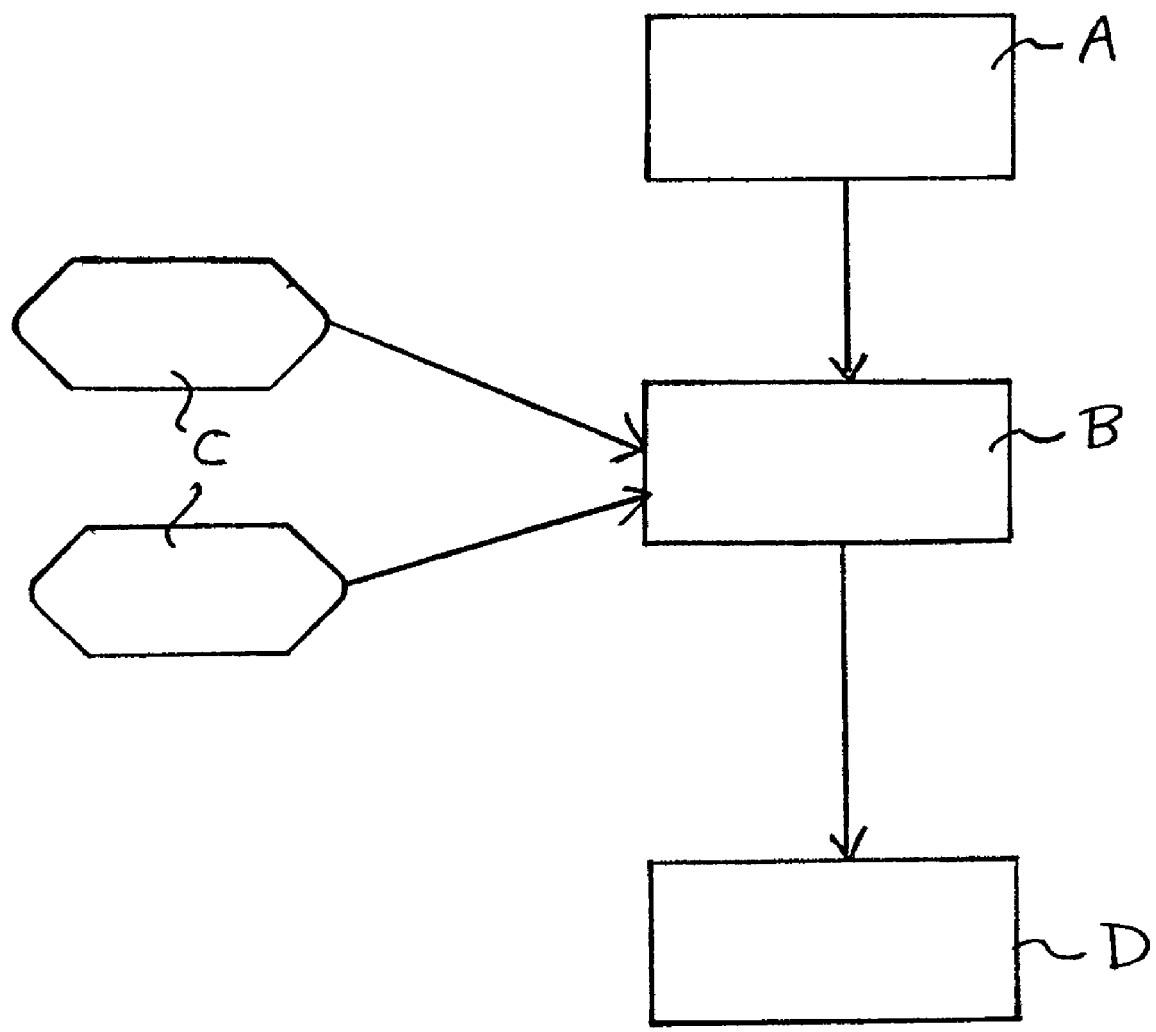
FIG. 5 is a schematic block diagram view of the method or process steps utilized in practice of the invention.

FIG. 5 shows, in block diagram form, the critical method steps of the invention as follows:

A) Providing an expansion tank having a bladder, membrane or diaphragm which is anchored at a lower point;
B) Providing that an alarm module be attached to the expansion tank at a point about one-third of the way down the tank;
C) Providing that components of the alarm module are responsive to both a condition of flooding in the tank and a condition of bladder/membrane over-extension;
D) Indicating via visual or sonic alarm means the existence of such condition or conditions.

Figure 6:
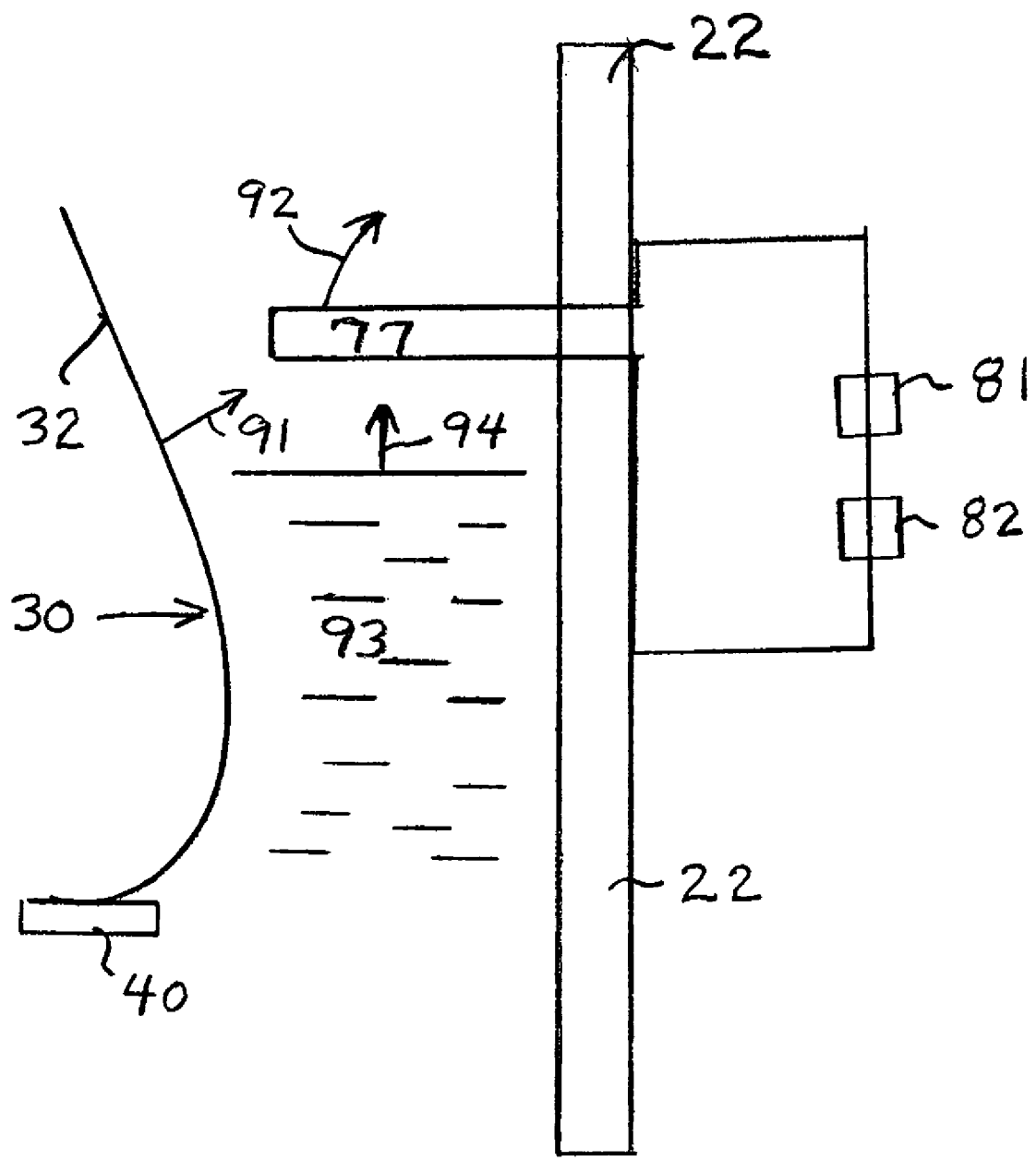
FIG. 6 is a schematic view illustrating the plural conditions which may activate the alarm module into a visual or audio alarm condition.

FIG. 6 further shows critical aspects of the invention in schematic form.

The bladder or diaphragm 30 is anchored at position 40. Bladder 30 has an upper middle area 32. If bladder section 32 moves too far to the right, as indicated by arrow 91, it contacts element 77 and moves it upwardly as indicated by arrow 92. Such activates alarms 81, 82.

Further, if a flooding condition results in water level 93 between the bladder and the tank wall 22, element 77 is moved upwardly as indicated by water pressure arrow 94. Such activates alarms 81, 82.

It is further important to realize that the expansion tank is part of an overall system as shown in FIG. 1. When a system failure is detected, by lack of heating in a radiator for example, it is important to be able to rule out possible failure locations.

The present invention is an important aid in ruling in or ruling out the expansion tank as a possible problem area. It is thus a safety and time-saving feature.

While a particular system and method of use have been shown and described, it is intended in this specification to cover all equivalent systems and methods which would reasonably occur to those of skill in the fluid mechanics and HVAC arts.

The invention is further defined by the claims appended hereto.

I claim:

1. A water expansion tank in combination with an HVAC system, said water expansion tank including top, bottom left side and right side wall portions, the top wall portion including a first aperture for admitting compressed air, the top wall portion further including a second aperture for receiving the upper end of a bladder or diaphragm which receives excess water from the HVAC system, an alarm module positioned in the right hand wall portion of said expansion tank, said alarm module including sensor means for detecting a condition of tank flooding wherein said alarm module is positioned so that it also detects a condition of bladder over-flexing and indicates such over-flexing by completing an alarm circuit by using a pivotable sensor.

2. The water expansion tank of claim 1 wherein the bladder includes an upper reduced area portion, an upper middle portion and a lower wider portion wherein said lower portion is supported and anchored in a fixed position by gravity.

3. The water expansion tank of claim 2 wherein the alarm module is positioned about one-third of the way down the expansion tank and the bladder element.

4. The water expansion tank of claim 3 wherein said alarm module includes a left section having a circuit protection area and at least two circuit lines, said alarm module further including a fixed extended arm having a pivot point with an L-shaped piece being attached to the pivot point, said L-shaped piece having a magnet and a float mounted thereon.

5. The water expansion tank of claim 4 wherein said alarm module includes a flange portion and a right section having a least one alarm indicator.

* * * * *